US012257853B2

(12) United States Patent
Tsubaki

(10) Patent No.: US 12,257,853 B2
(45) Date of Patent: Mar. 25, 2025

(54) RECORDING-HEAD POSITION ADJUSTMENT MECHANISM, RECORDING-HEAD MODULE, AND IMAGE FORMING APPARATUS

(71) Applicant: Kengo Tsubaki, Kanagawa (JP)

(72) Inventor: Kengo Tsubaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/530,474

(22) Filed: Nov. 19, 2021

(65) Prior Publication Data

US 2022/0169055 A1 Jun. 2, 2022

(30) Foreign Application Priority Data

Nov. 27, 2020 (JP) ................................ 2020-197054

(51) Int. Cl.
*B41J 25/00* (2006.01)

(52) U.S. Cl.
CPC .................................. *B41J 25/001* (2013.01)

(58) Field of Classification Search
None
See application file for complete search history.

(56) References Cited

U.S. PATENT DOCUMENTS 3,661,431 A * 5/1972 Wisecarver ........... F16C 29/045 384/58
6,213,580 B1 * 4/2001 Segerstrom ............ B41J 25/001 347/19
6,382,771 B1 * 5/2002 Ikeda ......................... B41J 2/14 347/55
6,834,925 B2 * 12/2004 Ikeda .................. B41J 2/04556 347/86
7,140,706 B2 * 11/2006 Nellen ................... B41J 25/316 347/8
9,162,503 B2 * 10/2015 Monteiro .............. B41J 25/316
2003/0081022 A1 * 5/2003 Lim ....................... B41J 25/308 347/8

(Continued)

FOREIGN PATENT DOCUMENTS

JP 2008-238138 10/2008
JP 2013-256077 12/2013

(Continued)

OTHER PUBLICATIONS

Extended European Search Report issued Mar. 30, 2022 in European Patent Application No. 21208269.7, 8 pages.

(Continued)

*Primary Examiner* — Alejandro Valencia
(74) *Attorney, Agent, or Firm* — XSENSUS LLP

(57) ABSTRACT

A recording-head position adjustment mechanism adjusts a position of a recording head that discharges liquid droplets. The recording-head position adjustment mechanism includes a supporting member and a discharge angle adjuster. The supporting member includes an upper support to support an upper portion of the recording head and a lower support to support a lower portion of the recording head. The discharge angle adjuster swings the lower portion around the upper portion as a fulcrum to adjust a discharge direction of the liquid droplets from the recording head.

10 Claims, 8 Drawing Sheets

(56) References Cited

U.S. PATENT DOCUMENTS

| | | | |
|---|---|---|---|
| 2006/0238565 A1 | 10/2006 | Jung et al. | |
| 2019/0061396 A1* | 2/2019 | Suzuki | B41J 2/21 |
| 2020/0139732 A1 | 5/2020 | Naruse et al. | |
| 2021/0162784 A1 | 6/2021 | Tsubaki | |

FOREIGN PATENT DOCUMENTS

| | | |
|---|---|---|
| JP | 2018-086730 A | 6/2018 |
| JP | 2019-142030 | 8/2019 |
| JP | 2020-055293 A | 4/2020 |

OTHER PUBLICATIONS

Office Action issued Apr. 22, 2024 in Japanese Patent Application No. 2020-197054, 8 pages.

* cited by examiner

RECORDING-HEAD POSITION ADJUSTMENT MECHANISM, RECORDING-HEAD MODULE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2020-197054, filed on Nov. 27, 2020, in the Japan Patent Office, the entire disclosure of which is hereby incorporated by reference herein.

BACKGROUND

Technical Field

Aspects of the present disclosure relate to a recording-head position adjustment mechanism to adjust a position of a recording head that discharges liquid droplets, and further relate to a recording-head module and an image forming apparatus, including the recording-head position adjustment mechanism.

Description of the Related Art

In an image forming apparatus, such as an inkjet printer, a technique is widely known that adjusts the positions of recording heads to form a good image.

Specifically, the image forming apparatus includes the recording heads (printing modules) for a plurality of colors that are arranged so as to face a sheet conveyed by a conveyor. The recording heads for the plurality of colors discharge liquid droplets toward the conveyed sheet to form a desired color image on the sheet.

SUMMARY

Embodiments of the present disclosure describe an improved recording-head position adjustment mechanism to adjust a position of a recording head that discharges liquid droplets. The recording-head position adjustment mechanism includes a supporting member and a discharge angle adjuster. The supporting member includes an upper support to support an upper portion of the recording head and a lower support to support a lower portion of the recording head. The discharge angle adjuster swings the lower portion around the upper portion as a fulcrum to adjust a discharge direction of the liquid droplets from the recording head.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
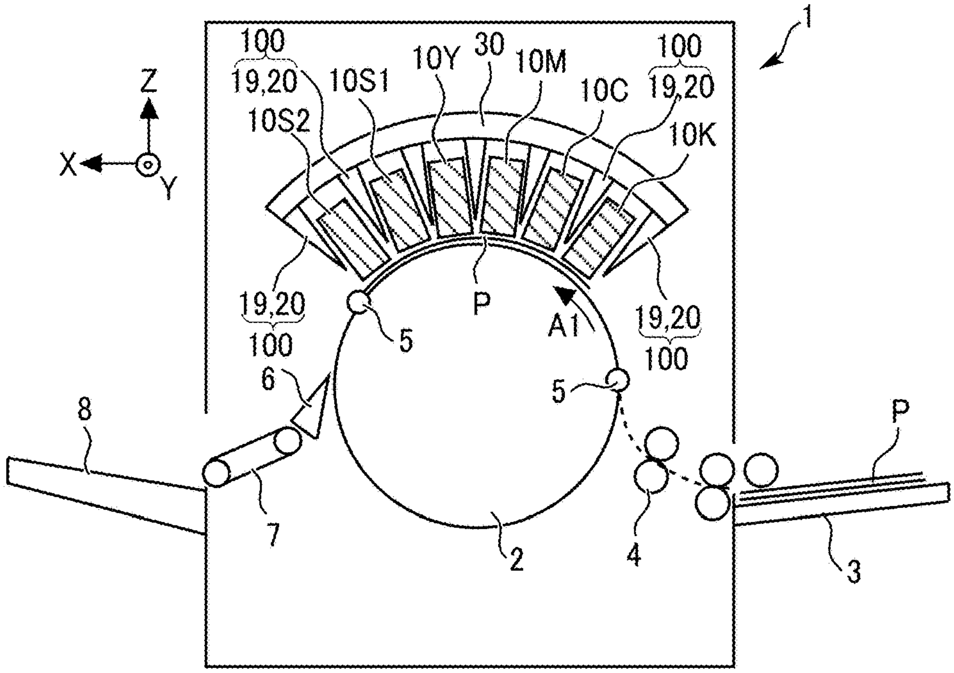
FIG. 1 is a schematic view illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a," "an," and "the" are intended to include the plural forms as well, unless the context clearly indicates otherwise.

It is to be noted that the suffixes Y, M, C, K, S1, and S2 attached to each reference numeral indicate only that components indicated thereby are used for forming yellow, magenta, cyan, black, and spot color images, respectively, and hereinafter may be omitted when color discrimination is not necessary.

Embodiments of the present disclosure are described in detail with reference to drawings. Identical reference numerals are assigned to identical components or equivalents and a description of those components is simplified or omitted as appropriate.

The configuration and operation of an image forming apparatus 1 according to the present embodiment is described below with reference to FIG. 1. In FIG. 1, the image forming apparatus 1 is illustrated as an inkjet printer.

The image forming apparatus 1 includes a conveyance drum 2 as a conveyor to convey a sheet P, a sheet feeding tray 3 on which sheets P to be printed are stacked, and grippers 5 to grip the sheet P on the conveyance drum 2. The image forming apparatus 1 further includes a separator 6 to separate the sheet P from the conveyance drum 2, a conveyance belt 7 to convey the sheet P separated from the conveyance drum 2, and a sheet ejection tray 8 onto which the printed sheet P is ejected and stacked.

The image forming apparatus 1 further includes recording heads (printing modules) 10Y, 10M, 10C, 10K, 10S1, and 10S2 serving as image forming units for printing, e.g., letters and images by an inkjet method, supporting members 100 to support (suspend) the recording heads 10Y, 10M, 10C, 10K, 10S1, and 10S2, and a base frame 30 to hold the supporting members 100. The supporting member 100 includes a first support 19 and a second support 20.

The image forming apparatus 1 according to the present embodiment forms a color image. As illustrated in FIG. 1, the image forming apparatus 1 includes the recording head 10K for black, the recording heads 10Y, 10M, and 10C for three colors (yellow, magenta, and cyan), and the recording heads 10S1 and 10S2 for coating (two spot colors). The six recording heads 10Y, 10M, 10C, 10K, 10S1, and 10S2 are opposed to the conveyance drum 2 and arranged side by side along the rotation direction of the conveyance drum 2. In other words, the plurality of recording heads 10Y, 10M, 10C, 10K, 10S1, and 10S2 and a plurality of recording-head position adjustment mechanisms 150 (see FIGS. 2 and 3) to be described later are radially arranged side by side along the direction (or a conveyance direction of the sheet P) intersecting a longitudinal direction of the recording heads 10Y, 10M, 10C, 10K, 10S1, and 10S2. The longitudinal direction is perpendicular to the surface of the paper on which FIG. 1 is drawn.

Figure 2:
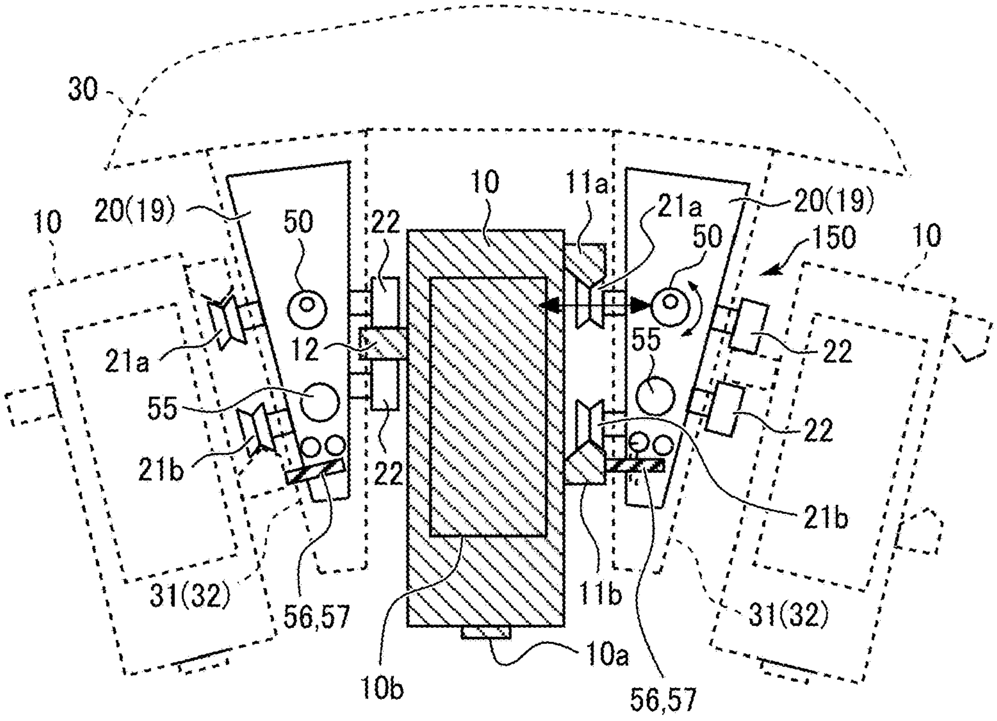
FIG. 2 is a schematic view of a recording head suspended by a supporting member according to an embodiment of the present disclosure.
Figure 3:
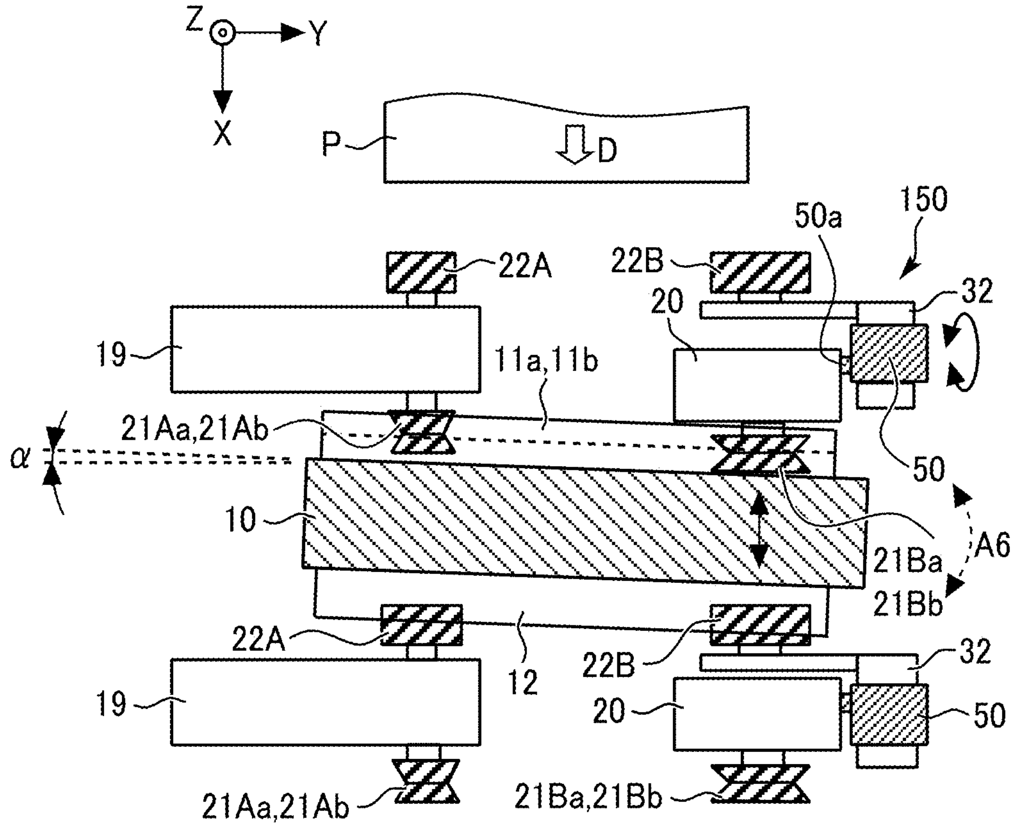
FIG. 3 is a top view of the recording head supported by a first support and a second support of the supporting member.

Since the six recording heads 10Y, 10M, 10C, 10K, 10S1, and 10S2 have substantially the same structure except that the colors (types) of inks used for printing are different, the suffixes Y, M, C, K, S1, and S2 attached to the reference numeral of the recording head 10 are omitted in FIGS. 2 and 3. For the sake of understanding the recording head 10, the recording head 10 indicated by a solid line is not inclined in FIG. 2, but in reality, as illustrated in FIG. 1 (or FIG. 12), all of six recording heads 10Y, 10M, 10C, 10K, 10S1, and 10S2 are inclined in the image forming apparatus 1. As illustrated in FIG. 2, a main part of the recording head 10 includes a piezoelectric actuator, a thermal actuator, or the like, and further includes a nozzle 10*a* to discharge ink as liquid droplets, an ink tank 10*b* filled with ink, and a control board (controller).

The operation of the image forming apparatus 1 is briefly described with reference to FIG. 1. First, when a print command is input together with image data from, e.g., a personal computer to the controller of the image forming apparatus 1, the sheet P is fed from the sheet feeding tray 3 by a sheet feeding roller. The sheet P fed from the sheet feeding tray 3 is conveyed toward the conveyance drum 2 by a conveyance roller pair 4. Meanwhile, in the recording heads 10Y, 10M, 10C, 10K, 10S1, and 10S2 for the respective colors, the input image data are converted into writing data of the respective colors.

The sheet P conveyed to the conveyance drum 2 is gripped by the gripper 5 and positioned on the conveyance drum 2. The conveyance drum 2 conveys the sheet P while rotating counterclockwise. As the conveyance drum 2 rotates, the sheet P is conveyed in the direction indicated by arrow A1 in FIG. 1. The recording heads 10Y, 10M, 10C, 10K, 10S1, and 10S2 sequentially discharge inks of the respective colors as liquid droplets onto the sheet P based on the writing data. Thus, a desired image is formed on the sheet P. The sheet P, on which the desired image has been formed, is separated from the conveyance drum 2 by the separator 6. The sheet P separated from the conveyance drum 2 is conveyed by the conveyance belt 7 and ejected onto the sheet ejection tray 8.

A description is given below of a recording-head position adjustment mechanism 150 to adjust the position of the recording head 10 that discharges ink (liquid droplets) in the image forming apparatus 1 having such a configuration with reference to FIGS. 2 and 3. The recording-head position adjustment mechanism 150 according to the present embodiment includes an inclination adjuster 50 and discharge angle adjusters 56 or 57. The inclination adjuster 50 adjusts an inclination a (see FIG. 3) of the recording head 10 in the longitudinal direction. The discharge angle adjusters 56 and 57 adjust a direction of liquid droplets discharged from the nozzle 10*a* of the recording head 10 (i.e., a discharge angle β, see FIG. 10).

As illustrated in FIGS. 2 to 4C, the image forming apparatus 1 includes the supporting member 100 (see FIG. 1) including the first and second supports 19 and 20 to support the recording head 10. The recording head 10 can be drawn out in a predetermined direction (i.e., +Y direction in FIG. 3). That is, the replaceable recording head 10 is removably installed in the image forming apparatus 1 (recording-head position adjustment mechanism 150) so that the recording head 10 can be drawn out from the image forming apparatus 1 in +Y direction or installed into the image forming apparatus 1 in −Y direction. When ink stored in the ink tank 10*b* is depleted, the recording head 10 is drawn out, and a new recording head 10 is installed for replacement.

Here, the recording-head position adjustment mechanism 150 includes the supporting member 100 including the first support 19 and the second support 20. The first support 19 supports one end of the recording head 10 in the longitudinal direction (i.e., a first predetermined position). The second support 20 supports the other end of the recording head in the longitudinal direction (i.e., a second predetermined position different from the first predetermined position). Hereinafter, the one end of the recording head 10 in the longitudinal direction is referred to as a "first end," and the other end of the recording head 10 in the longitudinal direction is referred to as a "second end." The recording head 10 is removably installed in the longitudinal direction (i.e., an installation direction). The longitudinal direction, which is ±Y directions, is substantially perpendicular to the conveyance direction of the sheet P indicated by arrow D in FIG. 3.

Specifically, the supporting member 100 includes a pair of the first supports 19 and a pair of the second supports 20 sandwiching the recording head 10 in the substantially horizontal direction. In the present embodiment, as illustrated in FIG. 3, the supporting member 100 is divided into the pair of the first supports 19 to support the first end of the recording head 10 in the longitudinal direction and the pair of the second supports 20 to support the second end of the recording head 10 in the longitudinal direction. The first end is the back side of the recording head 10, and the second end is the front side of the recording head 10 in the installation direction. That is, the first support 19 includes a first support portion at the first end and a second support portion at the first end in the longitudinal direction. The second support 20 includes a first support portion at the second end and a second support portion at the second end in the longitudinal direction. The first support portion at the first end of one first support 19 and the second support portion at the first end of the other first support 19 sandwiches the first end of the recording head 10. The first support portion at the second end of one second support 20 and the second support portion at the second end of the other second support 20 sandwiches the second end of the recording head 10. Thus, the supporting member 100 including the pair of the first supports 19 and the pair of the second supports 20 supports the recording head 10.

As illustrated in FIG. 3, the first support 19 includes a first upper grooved roller 21Aa and a first lower grooved roller 21Ab (hereinafter, collectively referred to as first grooved rollers 21Aa and 21Ab) serving as the first support portion at the first end, and two first columnar rollers 22A serving as the second support portion at the first end. The first grooved rollers 21Aa and 21Ab engage and support one edge of the recording head 10 in a transverse direction of the recording head 10 at the first end in the longitudinal direction. The first columnar rollers 22A support the other edge of the recording head 10 in the transverse direction at the first end in the longitudinal direction so that the recording head 10 is movable on the first columnar rollers 22A. Hereinafter, the one edge of the recording head in the transverse direction is referred to as a "first edge", and the other edge of the recording head 10 in the transverse direction is referred to as a "second edge". The first support 19 is secured to the image forming apparatus 1 (side frame 31), and the discharge angle adjuster 57, which is described later, is installed in the first support 19.

Similarly, the second support 20 includes a second upper grooved roller 21Ba and a second lower grooved roller 21Bb (hereinafter, collectively referred to as second grooved rollers 21Ba and 21Bb) serving as the first support portion at the second end, and two second columnar rollers 22B serving as the second support portion at the second end. The second grooved rollers 21Ba and 21Bb engage and support the first edge of the recording head 10 in the transverse direction at the second end in the longitudinal direction. The second columnar rollers 22B support the second edge of the recording head 10 in the transverse direction at the second end in the longitudinal direction so that the recording head 10 is movable on the second columnar rollers 22B. The inclination adjuster 50 and the discharge angle adjuster 56, which are described later, are installed in the second support 20.

Specifically, the recording head 10 includes two ridged rails 11*a* and 11*b* as a first slider at the first edge and a flat rail 12 as a second slider at the second edge in the transverse direction. The transverse direction is perpendicular to the longitudinal direction and substantially the same as the conveyance direction of the sheet P. The ridged rails 11*a* and 11*b* are disposed vertically apart. As illustrated in FIG. 2, each of the ridged rails 11*a* and 11*b* has a guide surface with a V-shaped projection, and the flat rail 12 has a flat guide surface. The ridged rails 11*a* and 11*b* and the flat rail 12 extend in the installation direction in which the recording head 10 is removably installed (i.e., ±Y directions).

The first and second grooved rollers 21Aa, 21Ab, 21Ba, and 21Bb have a V-shaped groove on the outer circumferential surface and are rotatably supported by bodies of the first and second supports 19 and 20. The first and second columnar rollers 22A and 22B have a flat outer circumferential surface and are rotatably supported by the bodies of the first and second supports 19 and 20.

The two first grooved rollers 21Aa and 21Ab (first support portion at the first end) disposed vertically apart engage the two ridged rails 11*a* and 11*b* (first slider) disposed vertically apart on the recording head 10, respectively. The two first columnar rollers 22A (second support portion at the first end) contact the flat rail 12 (second slider) of the recording head 10 so as to sandwich the flat rail 12 from above and below. Specifically, the first grooved rollers 21Aa and 21Ab are first rotators that slidably support the ridged rails 11*a* and 11*b* of recording head 10 in the longitudinal direction of the recording head 10, respectively, while restricting the ridged rails 11*a* and 11*b* from moving in the transverse direction intersecting the longitudinal direction relative to the first grooved rollers 21Aa and 21Ab. The first columnar rollers 22A are second rotators that slidably support the flat rail 12 of the recording head 10 in the longitudinal direction of the recording head 10. Further, the first columnar rollers 22A as the second rotators slidably support the flat rail 12 in the transverse direction of the recording head 10.

Similarly, the two second grooved rollers 21Ba and 21Bb disposed vertically apart engage the two ridged rails 11*a* and 11*b* disposed vertically apart on the recording head 10, respectively. The two second columnar rollers 22B contact the flat rail 12 of the recording head 10 so as to sandwich the flat rail 12 from above and below. Specifically, the second grooved rollers 21Ba and 21Bb are third rotators that slidably support the ridged rails 11*a* and 11*b* of the recording head 10 in the longitudinal direction of the recording head 10, respectively, while restricting the ridged rails 11*a* and 11*b* from moving in the transverse direction intersecting the longitudinal direction relative to the second grooved rollers 21Ba and 21Bb. The second columnar rollers 22B are fourth rotators that slidably support the flat rail 12 of the recording head 10 in the longitudinal direction of the recording head 10. Further, the second columnar rollers 22B as the fourth rotators slidably support the flat rail 12 in the transverse direction of the recording head 10.

While the first and second grooved rollers 21Aa, 21Ab, 21Ba, and 21Bb and the first and second columnar rollers 22A and 22B rotate, the ridged rails 11*a* and 11*b* and the flat rail 12 move on the first and second grooved rollers 21Aa, 21Ab, 21Ba, and 21Bb and the first and second columnar rollers 22A and 22B. Thus, the recording head 10 is removably installed in ±Y directions.

Figure 12:
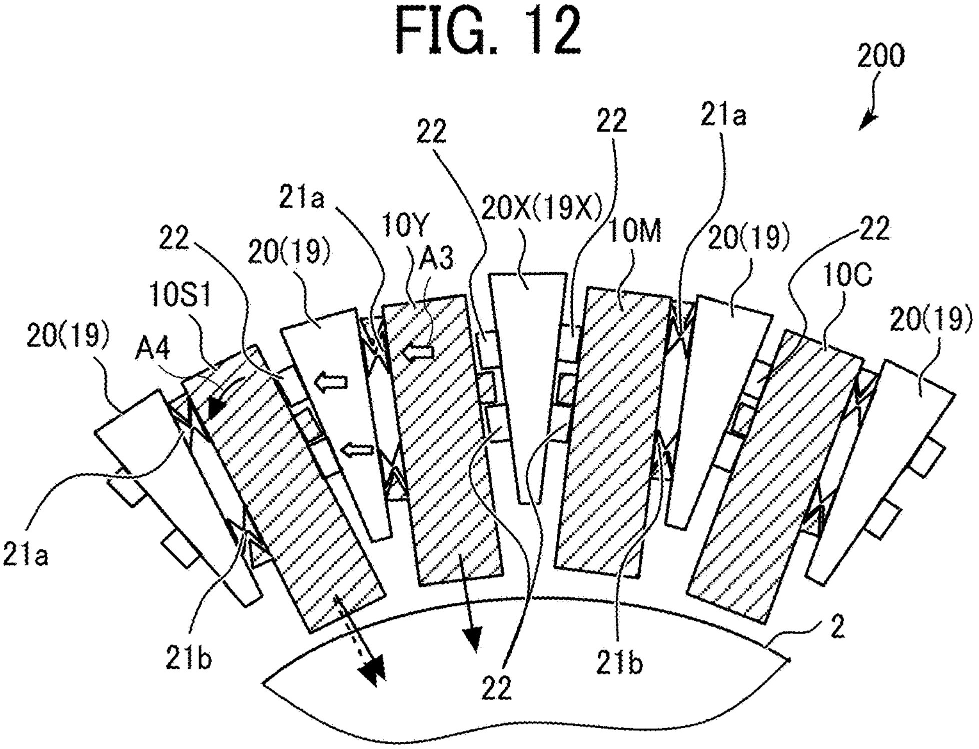
FIG. 12 is a schematic view of a plurality of recording heads arranged along a conveyance drum according to an embodiment of the present disclosure.

The first and second grooved rollers 21Aa, 21Ab, 21Ba, and 21Bb described above are classified into an upper support (i.e., the first upper grooved roller 21Aa and the second upper grooved roller 21Ba) that supports the upper portion of the recording head 10 and a lower support (i.e., the first lower grooved roller 21Ab and the second lower grooved roller 21Bb) that supports the lower portion of the recording head 10, which is described later in detail. Hereinafter, the first and second grooved rollers 21Aa, 21Ab, 21Ba, and 21Bb are simply referred to as the groove rollers 21Aa, 21Ab, 21Ba, and 21Bb, and the first and second columnar rollers 22A and 22B are simply referred to as the columnar rollers 22A and 22B. In the drawings, when two rollers completely overlap, the suffix (or a part of the suffix) of reference numerals may be omitted, for example, the columnar rollers 22A and the columnar rollers 22B overlap and are indicated by the reference numeral 22, and the first upper grooved roller 21Aa and the second upper grooved roller 21Ba overlap and are indicated by the reference numeral 21*a* as illustrated in FIGS. 2, 12, and the like.

With such a configuration, the recording head 10 is removably installed in the image forming apparatus 1 while being restricted from moving in ±X directions by the grooved rollers 21Aa, 21Ab, 21Ba, and 21Bb having the V-shaped groove. Accordingly, the recording head 10 can be smoothly installed in and removed from the image forming apparatus 1 without damages to the recording head 10 caused by interference with other components. That is, the grooved rollers 21Aa, 21Ab, 21Ba, and 21Bb function not only as positioning members for the recording head 10, but also as guide members for facilitating the installation and removal operation of the recording head 10.

In the present embodiment, the grooved rollers 21Aa, 21Ab, 21Ba, and 21Bb have the V-shaped groove, and the ridged rails 11*a* and 11*b* have the V-shaped projection. The V-shaped projection engages the V-shaped groove, thereby restricting the recording head 10 from moving in the ±X directions. However, the shape of the groove on the grooved rollers 21Aa, 21Ab, 21Ba, and 21Bb and the shape of the projection on the ridged rails 11*a* and 11*b* are not limited to the V-shape but may be any other suitable shape that can meet such a function, for example, a W-shape or a shape in which three or more V shapes are arranged.

As illustrated in FIGS. 2 and 3, in the present embodiment, the first support 19 includes other first columnar rollers 22A disposed on the opposite side of the portion where the first grooved rollers 21Aa and 21Ab are disposed in order to support another recording head 10 adjacent to the recording head 10. Similarly, the second support 20 includes other second columnar rollers 22B disposed on the opposite side of the portion where the second grooved rollers 21Ba and 21Bb are disposed in order to support another recording head 10 adjacent to the recording head 10. With such a configuration, the plurality of the recording heads 10Y, 10M, 10C, 10K, 10S1, and 10S2 can be compactly installed in the image forming apparatus 1 along the conveyance direction of the sheet P.

Figure 4A:
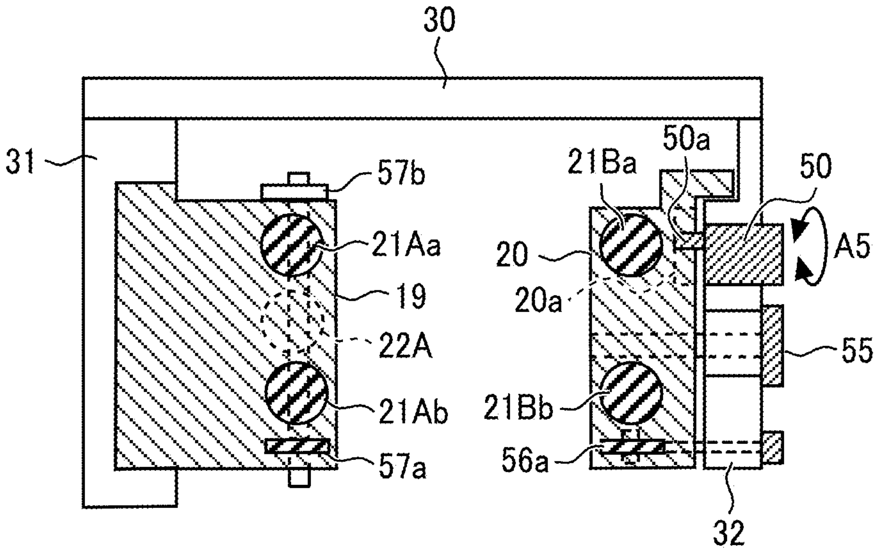
FIGS. 4A, 4B, and 4C are a side view, a front view, and a top view illustrating a part of a recording-head position adjustment mechanism according to an embodiment of the present disclosure, respectively.

As illustrated in FIG. 4A, in the present embodiment, the first support 19 is secured to the side frame 31 coupled to the base frame 30 disposed on the ceiling of the image forming apparatus 1. That is, the first support 19 is stationarily installed at the secured position in the image forming apparatus 1. On the other hand, the second support 20 is slidable in the transverse direction (i.e., the direction perpendicular to the surface of the paper in which FIG. 4A is drawn and the direction indicated by arrow A2 in FIG. 4C) relative to a side frame 32 coupled to the base frame 30. That is, the second support 20 is slidably supported in the image forming apparatus 1.

In particular, in the present embodiment, the second support 20 includes other second columnar rollers 22B disposed on the opposite side of the portion where the second grooved rollers 21Ba and 21Bb are disposed such that the second columnar rollers 22B does not follow the movement (slide) of the second grooved rollers 21Ba and 21Bb, in order to support another recording head 10 adjacent to the recording head 10.

Figure 4B:
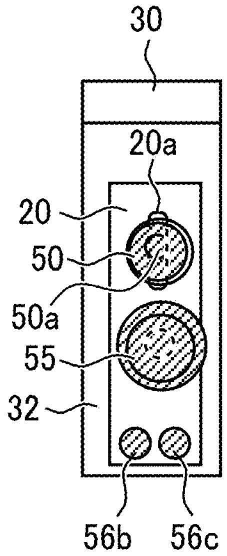
Figure 4C:
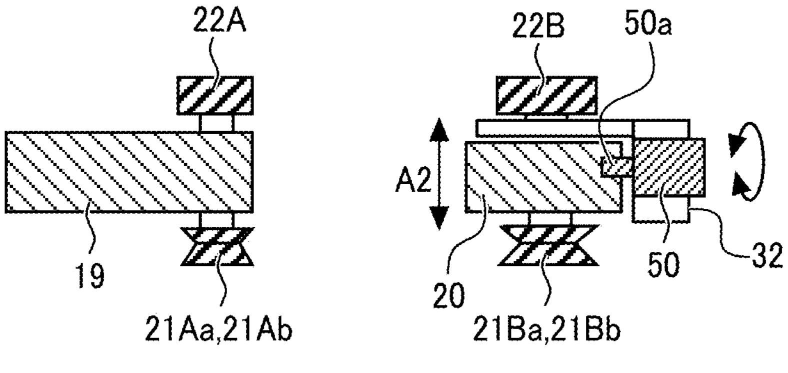

Specifically, as illustrated in FIGS. 3, 4C, and 11, the second grooved rollers 21Ba and 21Bb are directly attached to the main portion of the second support 20 that is slidable relative to the side frame 32. On the other hand, the second columnar rollers 22B are not directly attached to the main portion of the second support 20, but is secured to the side frame 32. That is, the second support 20 has a two-body structure divided into a portion where the second grooved rollers 21Ba and 21Bb are disposed and a portion where the second columnar rollers 22B are disposed. With such a configuration, even when the main portion of the second support 20 to which the second grooved rollers 21Ba and 21Bb are attached slides during inclination adjustment of the recording head 10, which is described later, the second columnar rollers 22B do not move in conjunction with the slide of the main portion.

If the second columnar rollers 22B moves in conjunction with the slide of the main portion, when the inclination adjuster 50 described later slides the recording head 10 (10Y) in the direction indicated by arrow A3 as illustrated in FIG. 12 to adjust the inclination a (see FIG. 3) of the recording head 10 (10Y) in the longitudinal direction, the adjacent recording head 10 (10S1) may be swung in the direction indicated by arrow A4 in FIG. 12, and the discharge direction (discharge angle (3, see FIG. 10) of liquid droplets may change. In such a case, as the inclination adjuster 50 slides the second grooved rollers 21Ba and 21Bb together with the recording head 10, the second columnar roller 22B is also slid in conjunction with the slide of the main portion of the second support 20 including the second grooved rollers 21Ba and 21Bb. As a result, the adjacent recording head 10 may receive force from the second columnar rollers 22B and may be swung in the direction indicated by arrow A4 in FIG. 12. On the other hand, in the present embodiment, the second columnar rollers 22B do not slides in conjunction with the slide of the second grooved rollers 21Ba and 21Bb, thereby preventing the adjacent recording head 10 from being unintentionally swung.

As illustrated in FIGS. 3 to 4C, the image forming apparatus 1 (the recording-head position adjustment mechanism 150) according to the present embodiment includes the inclination adjuster 50. The inclination adjuster 50 moves the second support 20 in the direction intersecting the longitudinal direction (i.e., the conveyance direction of the sheet P and the transverse direction) relative to the first support 19 to adjust the inclination of the recording head 10.

Specifically, the inclination adjuster 50 moves the second grooved rollers 21Ba and 21Bb in the transverse direction intersecting the longitudinal direction. Accordingly, the first edge in the transverse direction of the recording head 10 at the second end in the longitudinal direction is moved following the movement of the second grooved rollers 21Ba and 21Bb. As a result, the recording head 10 is swung around the first end in the longitudinal direction (i.e., the position of the first grooved rollers 21Aa and 21Ab), thereby adjusting the inclination of the recording head 10.

More specifically, the inclination adjuster 50 is an adjustment knob, which is rotatable, having an eccentric shaft 50*a*. The outer circumferential surface of the inclination adjuster 50 is rotatably held by the side frame 32 (see FIGS. 4A to 4C) in the direction indicated by arrow A5 in FIG. 4A. A circular hole is disposed on the side frame 32. A part of the outer circumferential surface of the inclination adjuster 50 in the axial direction fits into the circular hole, and the eccentric shaft 50*a* is held by the second support 20. A slot 20*a* is disposed on the second support 20 and long in the vertical direction. The outer circumferential surface of the eccentric shaft 50*a* of the inclination adjuster 50 fits into the slot 20*a* and slidably contacts the slot 20*a*.

With such a configuration, as the inclination adjuster 50 is manually rotated in the direction indicated by arrow A5 in FIG. 4A, the second support 20 slides in the direction perpendicular to the surface of the paper on which FIG. 4A is drawn (i.e., the transverse direction of the recording head 10). Accordingly, the recording head 10 is pulled by the second grooved rollers 21Ba and 21Bb of the second support 20 and swung around the first end in the longitudinal direction of recording head 10 in the direction indicated by arrow A6 in FIG. 3. As a result, the inclination a of the recording head 10 (i.e., squareness of recording head 10 with respect to the conveyance direction of the sheet P) is adjusted. At this time, on the second edge of the recording head 10 in the transverse direction, the flat rail 12 slidingly moves on the columnar rollers 22A and 22B. Therefore, the swing of the recording head 10 described above is not hindered. Further, for the same reason, when the recording head 10 is swung for adjustment of the inclination, the adjacent recording head 10 is not swung and the position (inclination) of the adjacent recording head 10 is not affected by the adjustment. The above-described accurate adjustment of the position (inclination) of the recording head 10 allows a good image to be formed on the sheet P without positional deviation.

When the inclination of the recording head 10 is adjusted as described above, the screwing of a securing member 55 illustrated in FIGS. 4A and 4B is temporarily released. The securing member 55 is screwed into a female screw of the second support 20 via the side frame 32, thereby securing the second support 20 to the side frame 32 of the image forming apparatus 1. Therefore, after the inclination adjuster 50 slidingly moves the second support to adjust the inclination of the recording head 10, the securing member 55 is screwed, thereby securing the second support 20 at the adjusted position.

In the present embodiment, the recording-head position adjustment mechanism 150 does not include a large supporting member that matches the size of the recording head 10 in the longitudinal direction. In the comparative example, the recording-head position adjustment mechanism swings the large supporting member that matches the size of the recording head 10 in the longitudinal direction to adjust the position (inclination) of the recording head 10. On the other hand, in the recording-head position adjustment mechanism 150 according to the present embodiment, the supporting member 100 is divided into the first support 19 and the second support 20 in the longitudinal direction. The inclination adjuster 50 slidingly moves only the second support 20 while the first support 19 remains static, thereby adjusting the position (inclination) of the recording head 10. Therefore, the position (inclination) of the recording head 10 can be easily adjusted without increasing the size of the apparatus.

In the present embodiment, the first support 19 and the second support 20 are manufactured as separate parts, and the body of each of the first support 19 and the second support 20 is manufactured by aluminum die casting. In particular, since the body of the second support 20, which is the housing portion excluding the second grooved rollers 21Ba and 21Bb, the second columnar rollers 22B, and the like) is made of aluminum, the weight of the second support 20 is reduced, thereby facilitating the manual operation of the inclination adjuster 50 to move the second support 20.

Further, in the present embodiment, as described above with reference to FIG. 3, the ridged rails 11*a* and 11*b* of recording head 10 engage the grooved rollers 21Aa, 21Ab, 21Ba, and 21Bb, and the flat rail 12 of recording head 10 is slidingly movable on the columnar rollers 22A and 22B. Therefore, the above-described operation of the inclination adjuster 50 to swing the recording head 10 is not hindered, and the recording head 10 is supported by the multiple rollers (i.e., the grooved rollers 21Aa, 21Ab, 21Ba, and 21Bb, and the columnar rollers 22A and 22B) in a well-balanced manner.

Further, the multiple rollers (i.e., the grooved rollers 21Aa, 21Ab, 21Ba, and 21Bb, and the columnar rollers 22A and 22B) are arranged at four balanced positions, i.e., the first edge in the transverse direction at the first end in the longitudinal direction, the second edge in the transverse direction at the first end in the longitudinal direction, the first edge in the transverse direction at the second end in the longitudinal direction, and the second edge in transverse direction at the second end in the longitudinal direction. This configuration can downsize the recording-head position adjustment mechanism 150 (image forming apparatus 1).

Figure 5A:
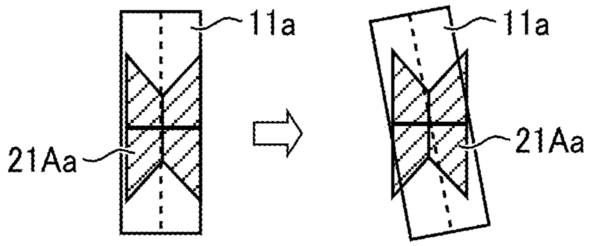
FIGS. 5A and 5B are schematic views of a grooved roller and a ridged rail according to an embodiment of the present disclosure.
Figure 5B:
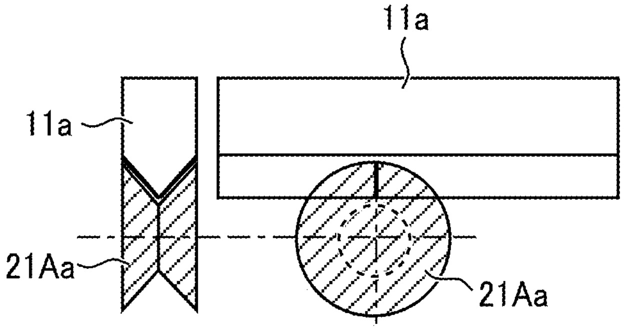

Here, the engagement of the grooved rollers 21Aa, 21Ab, 21Ba, and 21Bb, and the ridged rails 11*a* and 11*b* is described with reference to FIGS. 5A and 5B. The first upper grooved roller 21Aa and the ridged rail 11*a* are described as an example. The first upper grooved roller 21Aa has the V-shaped groove, that is, has a shape such that the tips on the small diameter side of two cones are combined. Accordingly, as illustrated in FIGS. 5A and 5B, the first upper grooved roller 21Aa is in line contact with the V-shaped projection of the ridged rail 11*a*. Therefore, as illustrated in FIG. 5A, even when the recording head 10 is inclined with respect to the longitudinal direction and the ridged rail 11*a* is inclined relative to the first upper grooved roller 21Aa, the line contact thereof is hardly changed. Therefore, the ridged rail 11*a* does not float from the first upper grooved roller 21Aa. That is, regardless of the posture of the recording head 10 in the inclination direction, the recording head 10 is supported by the four rollers (i.e., the grooved rollers 21Aa, 21Ab, 21Ba, and 21Bb) without floating.

In the present embodiment, the second support 20 and the inclination adjuster 50 are disposed at positions corresponding to the front side in the installation direction of the recording head 10. Specifically, a door is disposed on the front side of the image forming apparatus 1 in the installation direction. With the door opened, an operator pulls out the recording head 10 through the front side or inserts the recording head 10 toward the rear side of the image forming apparatus 1 in the installation direction. The inclination adjuster 50 is exposed to the operator when the door is opened. In the image forming apparatus 1, the second support 20 is disposed on the front side in the installation direction of the recording head 10, and the first support 19 is disposed on the rear side in the installation direction. With such a configuration, the operator can smoothly adjust the inclination of the recording head 10 by operating the inclination adjuster 50 with the door opened.

Figure 6:
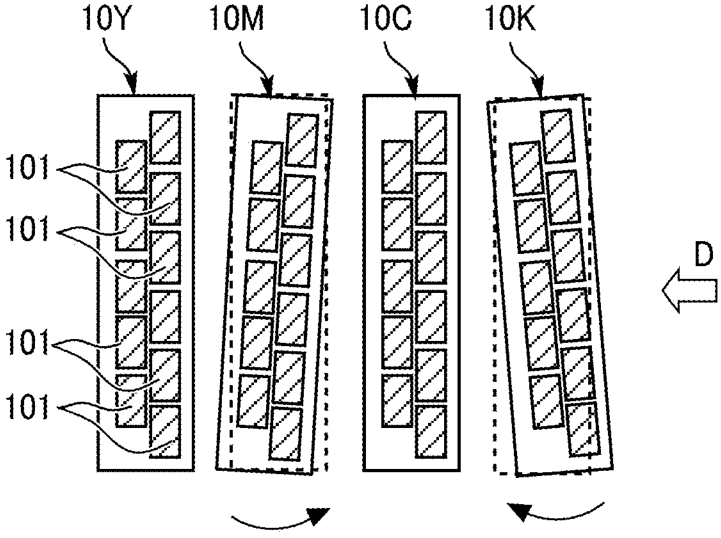
FIG. 6 is a top view illustrating the arrangement of four array-type recording heads according to a variation of the present disclosure.

As a variation, FIG. 6 is a top view illustrating the arrangement of four array-type recording heads 10Y, 10M, 10C, and 10K in the conveyance direction of the sheet P indicated by arrow D. In the above-described embodiment, each of the six recording heads 10Y, 10M, 10C, 10K, 10S1, and 10S2 includes a single head longer than the width of the sheet P. In the variation, the array-type recording heads 10Y, 10M, 10C, and 10K illustrated in FIG. 6 are arranged in parallel. Unlike the above-describe embodiment, each of the array-type recording heads 10Y, 10M, 10C, and 10K includes a plurality of heads 101 (11 heads in FIG. 6).

The recording-head position adjustment mechanism 150 according to the above-described embodiment can be applied to the array-type recording heads 10Y, 10M, 10C, and 10K. Accordingly, the array-type recording heads 10Y, 10M, 10C, and 10K can be easily adjusted without increasing the size of the recording-head position adjustment mechanism 150 (image forming apparatus 1). Specifically, in FIG. 6, among the four array-type recording heads 10Y, 10M, 10C, and 10K, the inclination adjuster 50 swings the array-type recording head 10M for magenta counterclockwise to adjust the inclination thereof, and swings the array-type recording head 10K for black clockwise to adjust the inclination thereof.

Here, as described above, the recording-head position adjustment mechanism 150 according to the present embodiment includes the supporting member 100 (the first support 19 and the second support 20) including an upper support (i.e., the first upper grooved roller 21Aa and the second upper grooved roller 21Ba) that supports the upper portion of the recording head 10 and a lower support (i.e., the first lower grooved roller 21Ab and the second lower grooved roller 21Bb) that supports the lower portion of the recording head 10.

Figure 10:
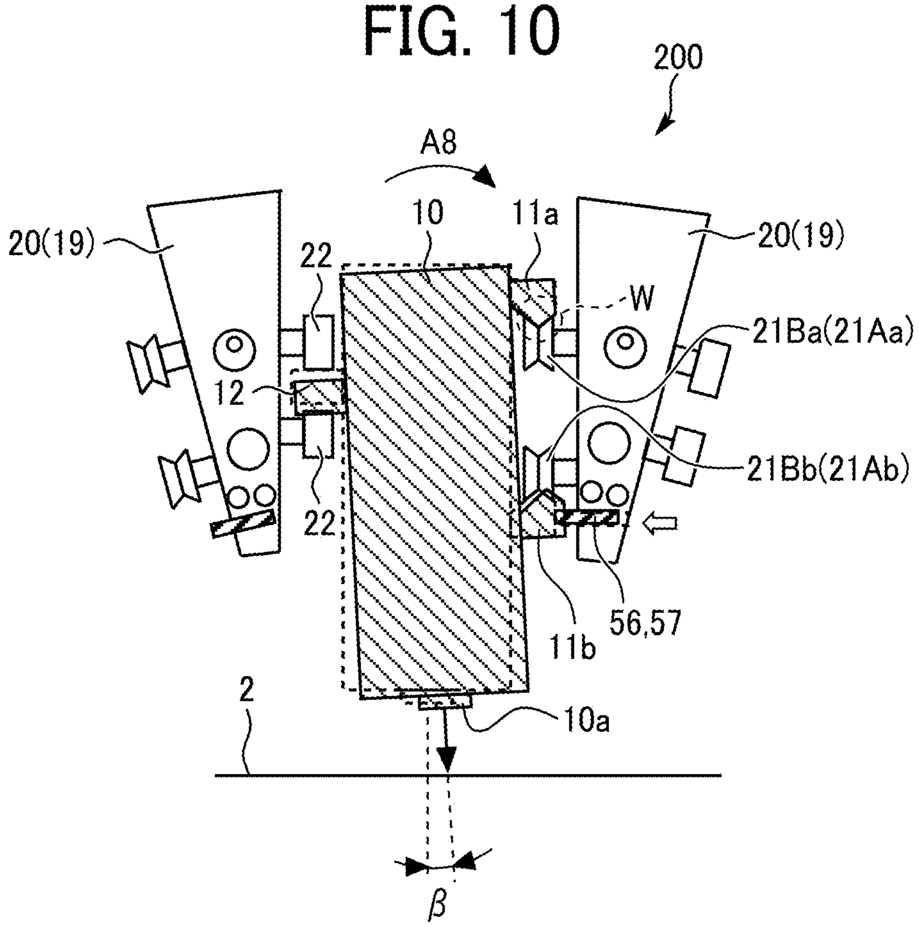
FIG. 10 is a schematic view illustrating an operation of adjusting a discharge angle of the recording head.

In addition to the inclination adjuster 50 described above, the recording-head position adjustment mechanism 150 according to the present embodiment includes the discharge angle adjusters 56 and 57 that adjust the direction of liquid droplets discharged from the nozzle 10*a* of the recording head 10 (i.e., the discharge angle β, see FIG. 10). The discharge angle adjusters 56 and 57 move the recording head 10 in the direction intersecting the longitudinal direction (substantially the same direction as the conveyance direction of the sheet P and the transverse direction) to swing the lower portion of the recording head 10 around an upper portion W (see FIG. 10) supported by the first and second upper grooved rollers 21Aa and 21Ba (upper support) as a fulcrum, thereby adjusting the direction (discharge angle β) of the liquid droplets discharged from the recording head 10. In other words, when the discharge angle β is adjusted, the recording head 10 is swung around the longitudinal axis with the V-shaped groove of the first and second upper grooved rollers 21Aa and 21Ba (upper support) as a fulcrum by the discharge angle adjusters 56 and 57.

The adjustment of the discharge angle (3 by the discharge angle adjusters 56 and 57 is also referred to as the adjustment of the discharge direction of the liquid droplets from the recording head 10 to the surface of the conveyance drum 2 (or the surface of the sheet P conveyed on the conveyance drum 2). As described above with reference to FIG. 12, the discharge angle adjusters 56 and 57 are provided so as to prevent the discharge angle (3 of the adjacent recording head 10 (10S1) from changing when the inclination adjuster 50 slides the recording head 10 (10Y) in the direction indicated by arrow A3 in FIG. 12 and adjusts the inclination a (see FIG. 3) of the recording head 10 in the longitudinal direction.

Here, with reference to FIG. 10, the discharge angle β of the recording head 10 is preferably 0 degrees, which is a target angle perpendicular to the surface of the conveyance drum 2 (or the surface of the sheet P). The discharge angle β is defined as an angle of the recording head 10 with respect to the target angle. When the discharge angle β is 0 degrees, liquid droplets are discharged straight (perpendicular) onto the sheet P, thereby forming a good image. On the other hand, as the discharge angle β increases, liquid droplets are discharged obliquely onto the sheet P, which may cause an image formed on the sheet P to deteriorate. Therefore, as the inclination adjuster 50 finishes adjusting the inclination a of each of the recording heads 10Y, 10M, 10C, 10K, 10S1, and 10S2 (i.e., after the securing member 55 secures the second support 20), the discharge angle adjusters 56 and 57 adjust the discharge angle β of each of the recording heads 10Y, 10M, 10C, 10K, 10S1, and 10S2.

Specifically, with reference to FIG. 10, in the present embodiment, the discharge angle adjusters 56 and 57 (in particular, adjustment rollers 56*a* and 57*a* described later) are disposed adjacent to the first and second lower grooved rollers 21Ab and 21Bb (lower supports), respectively. More specifically, the discharge angle adjusters 56 and 57 includes the adjustment rollers 56*a* and 57*a* to push the ridged rail 11*b* attached to the lower portion of the recording head 10, respectively. As a result, the recording head 10 can be efficiently swung around the upper portion W (see FIG. 10) supported by the first and second upper grooved rollers 21Aa and 21Ba (upper supports), and the discharge angle 3 can be efficiently adjusted.

In the present embodiment, in order to smoothly swing the recording head 10 around the upper portion W, preferably, the first and second lower grooved rollers 21Ab and 21Bb (lower supports) are disposed in the first and second supports 19 and 20, respectively, so as to be movable in the left-right direction in FIG. 10, or a play (backlash of about 1 to 3 mm) in the left-right direction in FIG. 10 is provided between the first and second lower grooved rollers 21Ab and 21Bb (lower supports) and the ridged rail 11*b*.

Figure 11A:
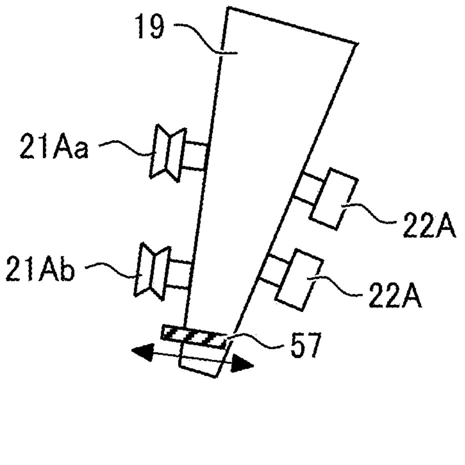
FIG. 11A is schematic view of the first support.
Figure 11B:
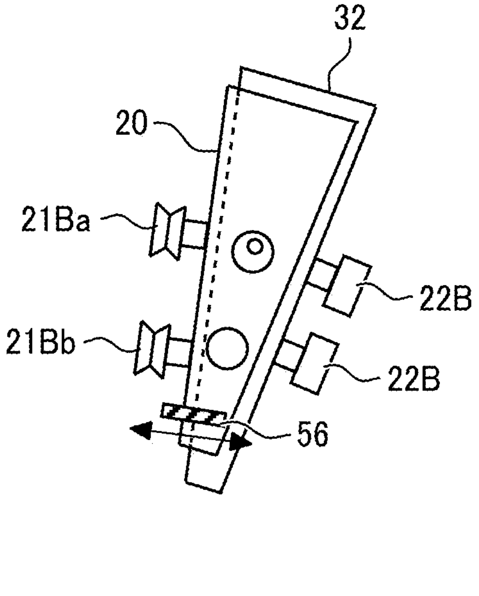
FIG. 11B is schematic view of the second support.

With reference to FIG. 10 and FIGS. 11A and 11B, in the present embodiment, the discharge angle adjusters 56 and 57 are provided in the first support 19 and the second support 20, respectively. The discharge angle adjuster 57 in the first support 19 and the discharge angle adjuster 56 in the second support 20 can adjust the discharge angle β independently of each other. With such a configuration, even if the recording head 10 has a long length in the longitudinal direction, the discharge angle β of the recording head 10 can be uniformly adjusted to the target angle over the longitudinal direction without a positional difference in the longitudinal direction and without torsion of the recording head 10.

In the present embodiment, the discharge angle adjuster 57 (see FIGS. 8A and 8B, and FIG. 9) in the first support 19 and the discharge angle adjuster 56 (see FIGS. 7A and 7B) in the second support 20 have different configurations. The discharge angle adjuster 57 in the first support 19 includes an eccentric shaft 57*b* serving as an operation portion. The eccentric shaft 57*b* projects from a ceiling (or bottom) of the first support 19. On the other hand, the discharge angle adjuster 56 in the second support 20 includes a return screw 56*b* and a pressing screw 56*c* serving as operation portions. The return screw 56*b* and the pressing screw 56*c* project from the front side of the second support 20 toward the front side in the installation direction of the recording head 10.

With such a configuration, with the door opened, an operator operates the return screw 56*b* and the pressing screw 56*c* from the front side in the installation direction to cause the discharge angle adjuster 56 of the second support 20 to adjust the discharge angle β. Further, the operator puts his/her hand into the rear side in the installation direction toward the ceiling (or bottom) of the first support 19 and operates the eccentric shaft 57*b* to cause the discharge angle adjuster 57 of the first support 19 to adjust the discharge angle β. With such a configuration, the discharge angle β of the recording head 10 can be smoothly adjusted.

Figure 7A:
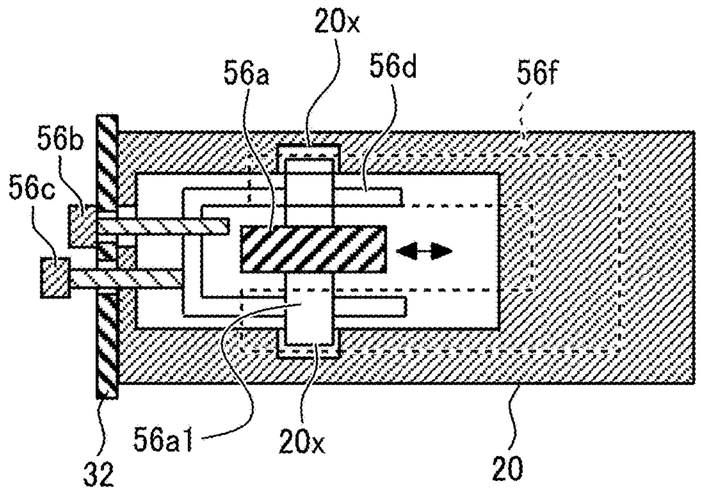
FIGS. 7A and 7B are schematic views of a discharge angle adjuster according to an embodiment of the present disclosure.
Figure 7B:
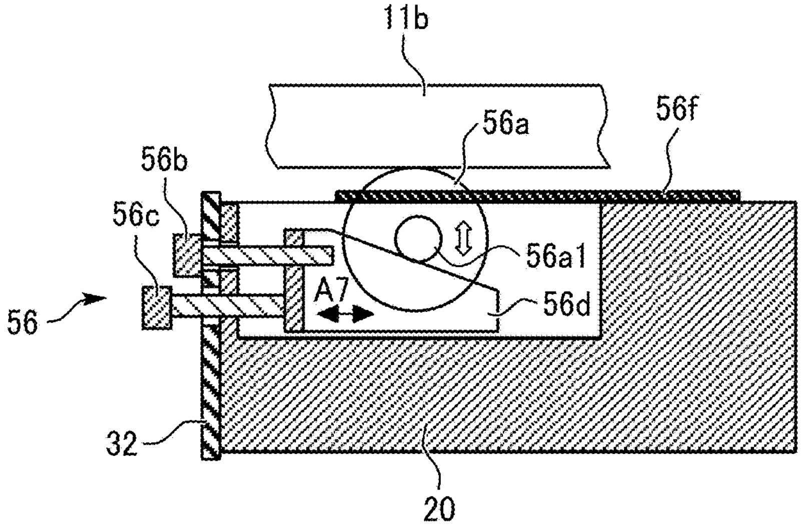

More specifically, the discharge angle adjuster 56 in the second support 20 is described in detail with reference to FIGS. 7A and 7B. As illustrated in FIGS. 7A and 7B, the discharge angle adjuster 56 includes the adjustment roller 56*a* as a pushing member, the return screw 56*b* as an operation portion, the pressing screw 56*c* as an operation portion, a wedge-shaped member 56*d* (biasing member), a restrictor 56*f*, and the like.

The adjustment roller 56*a* serving as a pushing member contacts the ridged rail 11*b* attached to the lower portion of the recording head 10. The adjustment roller 56*a* includes a shaft 56*a*1. Both ends of the shaft 56*a*1 are loosely held by grooves 20*x* of the second support 20. The grooves 20*x* position the adjustment roller 56*a* in the second support 20 in the up-down direction and the left-right direction in FIG. 7A. Both ends of the shaft 56*a*1 of the adjustment roller 56*a* contact an inclined surface of the wedge-shaped member 56*d* serving as a biasing member.

The return screw 56*b* serving as an operation portion is screwed into a female screw of the wedge-shaped member 56*d* to move the wedge-shaped member 56*d* in the direction indicated by arrow A7 in FIG. 7B. The pressing screw 56*c* serving as an operation portion is screwed into a female screw of the second support 20 and contacts the wedge-shaped member 56*d* to position the wedge-shaped member 56*d* in the left-right direction in FIG. 7B. The wedge-shaped member 56*d* is movable in a hollow portion of the second support 20 in the left-right direction in FIGS. 7A and 7B to push the adjustment roller 56*a* upward in FIG. 7B (in the direction in which the ridged rail 11*b* is pushed). The restrictor 56*f* comes into contact with the shaft 56*a*1 of the adjustment roller 56*a* to prevent the adjustment roller 56*a* from moving upward in FIG. 7B without limitation and falling off from the second support 20.

When the ridged rail 11*b* is pushed upward in FIG. 7B, the discharge angle adjuster 56 described above is operated as follows. First, the return screw 56*b* is rotated to loosen the screwing between the return screw 56*b* and the female screw of the wedge-shaped member 56*d*. Then, the pressing screw 56*c* is rotated to push the wedge-shaped member 56*d* to the right in FIGS. 7A and 7B, and the wedge-shaped member 56*d* moves the adjustment roller 56*a* upward in FIG. 7B. As a result, the recording head 10 is swung around the upper portion W supported by the second upper grooved roller 21Ba (upper support) in the direction indicated by arrow A8 as illustrated in FIG. 10. As the discharge angle β is adjusted to the target angle, the return screw 56*b* is rotated and tightened. Thus, force in the direction opposite to that of the pressing screw 56*c* acts on the wedge-shaped member 56*d*, thereby positioning (securing) the wedge-shaped member 56*d* (adjustment roller 56*a*) at the adjusted position.

On the other hand, when the ridged rail 11*b* is moved downward in FIG. 7B, the discharge angle adjuster 56 is operated as follows. First, the pressing screw 56*c* is rotated to release the contact between the pressing screw 56*c* and the wedge-shaped member 56*d*. Then, the return screw 56*b* is rotated and tightened to move the wedge-shaped member 56*d* to the left in FIGS. 7A and 7B, and the adjustment roller 56*a* moves downward in FIG. 7B along the inclined surface of the wedge-shaped member 56*d* due to the weight of the recording head acting on the adjustment roller 56*a*, which is described in detail later. As a result, the recording head 10 is swung around the upper portion W supported by the second upper grooved roller 21Ba (upper support) in the direction opposite to the direction indicated by arrow A8 in FIG. 10. As the discharge angle β is adjusted to the target angle, the pressing screw 56*c* is rotated and tightened. Thus, force in the direction opposite to that of the return screw 56*b* acts on the wedge-shaped member 56*d*, thereby positioning (securing) the wedge-shaped member 56*d* (adjustment roller 56*a*) at the adjusted position.

Figure 8A:
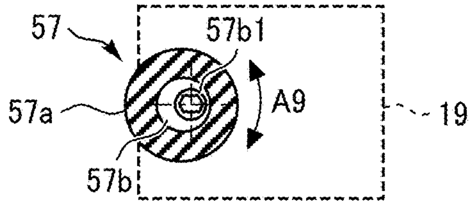
FIGS. 8A and 8B are schematic views of another discharge angle adjuster according to an embodiment of the present disclosure.
Figure 8B:
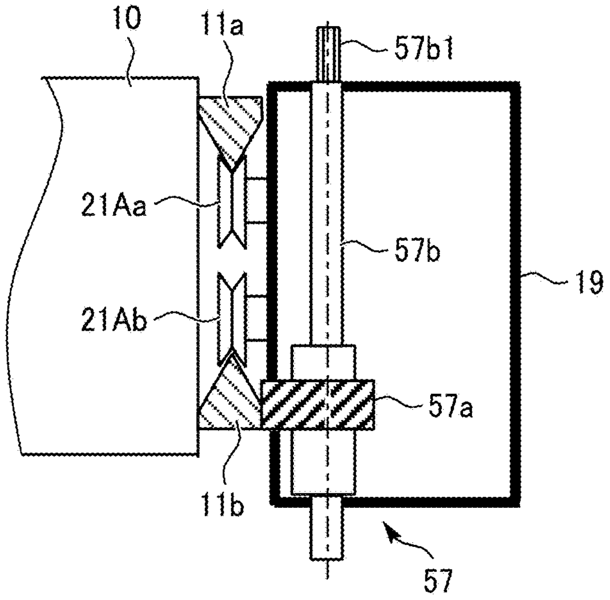
Figure 9:
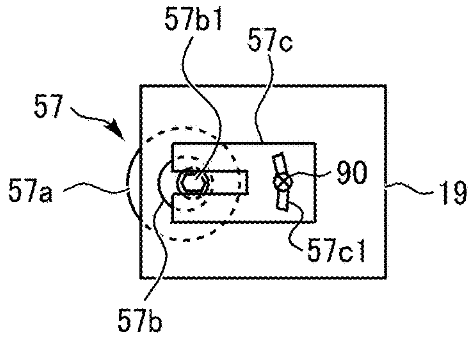
FIG. 9 is a top view of the discharge angle adjuster illustrated in FIGS. 8A and 8B.

Next, the discharge angle adjuster 57 in the first support 19 is described in detail with reference to FIGS. 8A and 8B, and FIG. 9. As illustrated in FIGS. 8A and 8B, and FIG. 9, the discharge angle adjuster 57 includes the adjustment roller 57*a* as a pushing member, the eccentric shaft 57*b* as an operation portion, a fixing plate 57*c* that secures the posture of the eccentric shaft 57*b* in the rotation direction, a fixing screw 90, and the like.

The adjustment roller 57*a* serving as a pushing member contacts the ridged rail 11*b* attached to the lower portion of the recording head 10. Both ends of the eccentric shaft 57*b* of the adjustment roller 57*a* are rotatably supported by the first support 19. The eccentric shaft 57*b* as an operation portion extends in a hollow portion of the first support 19 in the up-down direction in FIG. 8B. The eccentric shaft 57*b* has a large-diameter portion, and the large-diameter portion contacts an inner surface of the hollow portion of the first support 19, thereby positioning the adjustment roller 57*a* in the first support 19 in the vertical direction.

As the eccentric shaft 57*b* serving as an operation portion is rotated in the direction indicated by arrow A9 in FIG. 8A, the adjustment roller 57*a* is moved in the left-right direction in FIGS. 8A and 8B. With reference to FIG. 9, as the posture of the eccentric shaft 57*b* (adjustment roller 57*a*) in the rotation direction is determined, the fixing plate 57*c* is secured to the first support 19 by a screw 90 so as to fit onto a polygonal milling portion 57*b*1 formed at the tip of the eccentric shaft 57*b*. The polygonal milling portion 57*b*1 projects from the ceiling of the first support 19. The screw 90 is screwed into a female screw of the first support 19 through a slotted hole 57*c*1 of the fixing plate 57*c*.

When the ridged rail 11*b* is pushed to the left in FIG. 8B, the discharge angle adjuster 57 described above is operated as follows. First, the eccentric shaft 57*b* is rotated to direct a long-radius portion of the adjustment roller 57*a* to the left in FIG. 8B. As a result, the ridged rail 11*b* is pushed by the adjustment roller 57*a*, and the recording head 10 is swung around the upper portion W supported by the first upper grooved roller 21Aa (upper support) in the direction indicated by arrow A8 in FIG. 10. As the discharge angle β is adjusted to the target angle, the fixing plate 57*c* is fitted onto the milling portion 57*b*1 of the eccentric shaft 57*b*, and the fixing plate 57*c* is secured to the first support 19 by the screw 90.

On the other hand, when the ridged rail 11*b* is moved to the right in FIG. 8B, the discharge angle adjuster 56 is operated as follows. First, the eccentric shaft 57*b* is rotated to direct the long-radius portion of the adjustment roller 57*a* to the right in FIG. 8B. As a result, the ridged rail 11*b* moves to the right in FIG. 8B following the adjustment roller 57*a* due to the weight of the recording head 10, which is described in detail later, and the recording head is swung around the upper portion W supported by the first upper grooved roller 21Aa (upper support) in the direction opposite to the direction indicated by arrow A8 in FIG. 10. As the discharge angle θ is adjusted to the target angle, the fixing plate 57*c* is fitted onto the milling portion 57*b*1 of the eccentric shaft 57*b*, and the fixing plate 57*c* is secured to the first support 19 by the screw 90.

Here, in the present embodiment, as described above with reference to FIGS. 7A to 8B, in order to apply the weight of the recording head 10 to the adjustment rollers 56*a* and 57*a*, the recording head 10 is not installed straight (perpendicular to a horizontal plane) but is installed at an angle as illustrated in FIG. 12. Although only four recording heads 10Y, 10M, 10C, and 10S1 are illustrated in FIG. 12 for the sake of simplicity, the six recording heads 10Y, 10M, 10C, 10K, 10S1, and 10S2 are actually installed so as to be radially inclined as illustrated in FIG. 1.

Specifically, with reference to FIG. 11A, the first support 19 is inclined such that the side on which the first grooved rollers 21Aa and 21Ab (the first support portion at the first end) are disposed faces upward and the side on which the first columnar roller 22A (the second support portion at the first end) is disposed faces downward. Similarly, with reference to FIG. 11B, the second support 20 is inclined such that the side on which the second grooved rollers 21Ba and 21Bb (the first support portion at the second end) are disposed faces upward and the side on which the second columnar roller 22B (the second support portion at the second end) is disposed faces downward.

Specifically, with reference to FIG. 12, unlike the plurality of first and second supports 19 and 20, first and second center supports 19X and 20X includes the columnar rollers 22A and 22B on both the left side and the right side in FIG. 12. In the first and second supports 19 and 20 on the left side with respect to the first and second center supports 19X and 20X (downstream in the conveyance direction) in FIG. 12, the columnar rollers 22A and 22B are attached to the left side of the body of the first and second supports 19 and 20 in FIG. 12, and the grooved rollers 21Aa, 21Ab, 21Ba, and 21Bb are attached to the right side of the body in FIG. 12. In the first and second supports 19 and 20 on the right side with respect to the first and second center supports 19X and 20X (upstream in the conveyance direction) in FIG. 12, the columnar rollers 22A and 22B are attached to the right side of the body of the first and second supports 19 and 20 in FIG. 12, and the grooved rollers 21Aa, 21Ab, 21Bb, and 21Bb are attached to the left side of the body in FIG. 12.

Each of the multiple recording heads 10 includes the ridged rails 11*a* and 11*b* and the flat rail 12 in accordance with the arrangement of the grooved rollers 21Aa, 21Ab, 21Bb, and 21Bb and the columnar rollers 22A and 22B in the first and second supports 19 and 20. With this configuration, the adjustment roller 57*a* of the first support 19 and the adjustment roller 56*a* of the second support 20 constantly receive force from the recording head 10 against the pushing force of the adjustment rollers 56*a* and 57*a*. The force acts downward in FIG. 7B and to the right in FIG. 8B. In other words, the discharge angle adjusters 56 and 57 include the adjustment rollers 56*a* and 57*a* as pushing members to push the recording head 10 against the force received from the weight of the recording head 10, respectively. Thus, the discharge angle adjusters 56 and 57 described above have a relatively simple configuration.

In the image forming apparatus 1 according to the present embodiment, the plurality of recording-head position adjustment mechanisms 150 and the plurality of recording heads 10Y, 10M, 10C, 10K, 10S1, and 10S2 are radially arranged side by side along the curved surface (outer circumferential surface) of the conveyance drum 2. Therefore, the image forming apparatus 1 can adopt such a configuration described above.

As described above, the recording-head position adjustment mechanism 150 (image forming apparatus 1) according to the present embodiment adjusts the position of the recording head 10 that discharges liquid droplets. The recording-head position adjustment mechanism 150 includes the supporting member 100 (first support 19 and second support 20) including the first and second upper grooved rollers 21Aa and 21Ba (upper supports) to support the upper portion of the recording head 10, and the first and second lower grooved rollers 21Ab and 21Bb (lower supports) to support the lower portion of the recording head 10. The recording-head position adjustment mechanism 150 further includes the discharge angle adjusters 56 and 57. The discharge angle adjusters 56 and 57 swing the lower portion of the recording head 10 around the upper portion W supported by the first and second upper grooved rollers 21Aa and 21Ba as a fulcrum to adjust the direction (discharge angle β) of the liquid droplets discharged from the recording head 10.

With this configuration, the discharge direction of the liquid droplets from the recording head 10 can be easily adjusted without complicated configuration. In the above-described embodiments, the image forming apparatus 1 includes the six recording heads 10Y, 10M, 10C, 10K, 10S1, and 10S2. However, the number of recording heads is not limited to six but may be any suitable number.

Further, in the above-described embodiments, the plurality of recording heads 10Y, 10M, 10C, 10K, 10S1 and 10S2 are arranged in a radial pattern (on a curved surface) along the outer circumferential surface of the conveyance drum 2. However, when the sheet P is conveyed on a flat conveyance surface, a plurality of recording heads can be flatly arranged side by side along the flat conveyance surface.

In the present embodiment, the discharge angle adjuster 57 in the first support 19 and the discharge angle adjuster 56 in the second support 20 have different configurations. Alternatively, a discharge angle adjuster in the first support 19 and a discharge angle adjuster in the second support 20 may have the same configuration. The discharge angle adjusters 56 and 57 are not limited to the above-described embodiments, and various types of configurations can be used.

In such configurations, effects similar to those described above are also attained.

Further, in the above-described embodiments, the recording head 10 and the recording-head position adjustment mechanism 150 including the first and second supports 19 and 20, the base frame 30, the side frames 31 and 32 can be unitized and construct a recording-head module 200. In that case, the recording-head module 200 is removably installed in the image forming apparatus 1 in a single construction.

Further, in that case, the image forming apparatus 1 may include the recording-head module 200 in which a plurality of recording-head position adjustment mechanisms 150 and the plurality of recording heads 10Y, 10M, 10C, 10K, 10S1 and 10S2 are unitized.

In such configurations, effects similar to those described above are also attained.

In the above-described embodiment, the first and second supports 19 and 20 includes the first and second lower grooved rollers 21Ab and 21Bb as the lower supports, and the recording head 10 includes the ridged rail 11*b* that is pushed by the discharge angle adjusters 56 and 57 as described above with reference to FIG. 10. In order to smoothly swing the recording head 10 around the upper portion W (see FIG. 10), the first and second lower grooved rollers 21Ab and 21Bb (lower supports) are disposed in the first and second supports 19 and 20, respectively, so as to be movable in the left-right direction in FIG. 10, or a play (backlash) in the left-right direction in FIG. 10 is provided between the first and second lower grooved rollers 21Ab and 21Bb (lower supports) and the ridged rail 11*b*.

Figure 13:
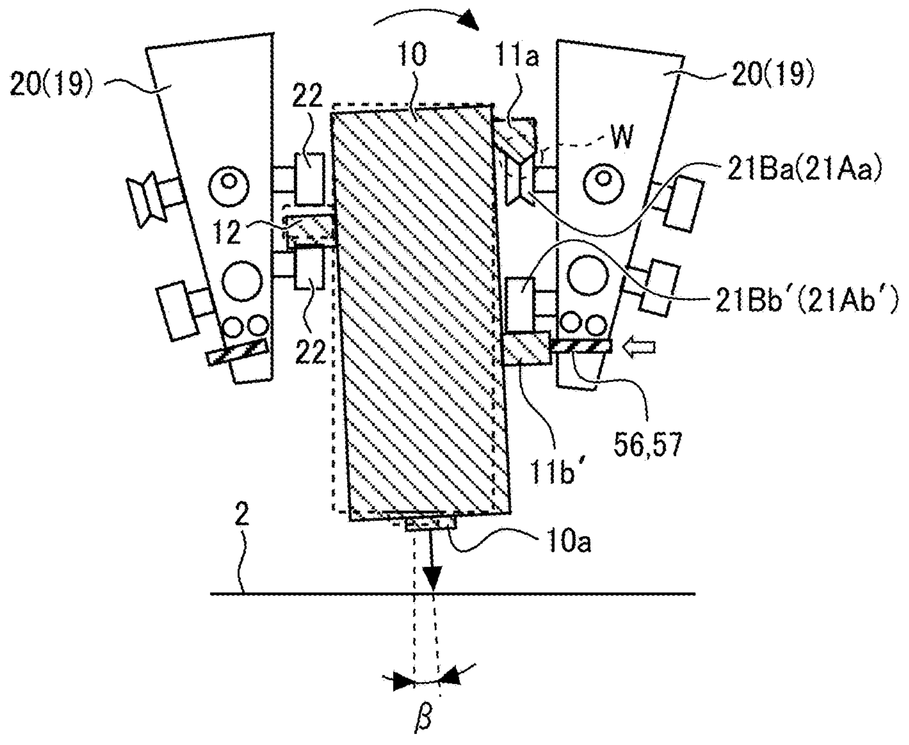
FIG. 13 is a schematic view illustrating an operation of adjusting the discharge angle of the recording head according to another variation of the present disclosure.

Alternatively, in order to smoothly swing the recording head 10 around the upper portion W, as illustrated in FIG. 13, the first and second supports 19 and 20 may include columnar rollers 21Ab' and 21Bb' as lower supports, respectively, and the recording head 10 may include a flat rail 11*b'*.

In such configurations, effects similar to those described above are also attained.

As described above, according to the present disclosure, the recording-head position adjustment mechanism, the recording-head module, and the image forming apparatus can be provided that can easily adjust the discharge direction of the liquid droplets from the recording head without the complicated configuration.

The above-described embodiments are illustrative and do not limit the present disclosure. Thus, numerous additional modifications and variations are possible in light of the above teachings. It is therefore to be understood that within the scope of the present disclosure, the present disclosure may be practiced otherwise than as specifically described herein. The number, position, and shape of the components described above are not limited to those embodiments described above. Desirable number, position, and shape can be determined to perform the present disclosure.

In the present specification, terms "the lower portion of the recording head" and "the upper portion of the recording head" represents a relative position on the recording head in the vertical direction and do not limit an absolute position on the recording head in the vertical direction. Therefore, for example, in some embodiments, even if the first and second lower grooved rollers 21Ab and 21Bb (lower supports) support a portion near the center or slightly above the center in the vertical direction of the recording head 10, the first and second lower grooved rollers 21Ab and 21Bb support "the lower portion of the recording head," and such a configuration is included in the scope of the technical idea of the present disclosure.

What is claimed is:

1. A recording-head position adjustment mechanism configured to adjust a position of a recording head that discharges liquid droplets, the recording-head position adjustment mechanism comprising:

a supporting structure including:

two ridge rails at a first edge of the recording head and one flat rail at a second edge of the recording head, the two ridge rails and the one flat rail each extending in a longitudinal direction of the recording head, each of the two ridge rails has a guide surface with a projection, and the one flat rail has a flat guide surface;

a first pair of grooved rollers at the first edge in an upper portion of the recording head, a second pair of grooved rollers at the first edge in a lower portion of the recording head, the first pair of grooved rollers engage one of the two ridge rails, and the second pair of grooved rollers engage another one of the two ridge rails;

a third pair of columnar rollers and a fourth pair of columnar rollers at the second edge, the third pair of columnar rollers and the fourth pair of columnar rollers configured to contact the flat rail so as to sandwich the flat rail from above and below respectively, wherein a gap exists between the one flat rail and one of the third pair of columnar rollers or the fourth pair of columnar rollers; and a discharge angle adjuster including an adjustment roller to push one of the two ridge rails attached to the lower portion of the recording head in a horizontal direction of from the first edge to the second edge to swing the lower portion around the upper portion supported by the first pair of grooved rollers as a fulcrum to adjust a discharge direction of the liquid droplets from the recording head, wherein the supporting structure further includes:

a first support to support a first end of the recording head in the longitudinal direction of the recording head; and a second support to support a second end of the recording head in the longitudinal direction, wherein the first support and the second support are disposed apart from each other in the longitudinal direction of the recording head, and the discharge angle adjuster includes a first discharge angle adjuster and a second discharge angle adjuster, which are disposed on the first support and the second support, respectively, wherein the recording-head position adjustment mechanism further comprises an inclination adjuster to move the second support relative to the first support in a transverse direction intersecting the longitudinal direction of the recording head to adjust an inclination of the recording head in the longitudinal direction, wherein the first support is stationarily secured to a side frame and includes:

the first pair of grooved rollers to support the first edge of the recording head in the transverse direction at the first end in the longitudinal direction; and the third pair of columnar rollers to support the second edge of the recording head in the transverse direction at the first end in the longitudinal direction, and wherein the second support includes:

the second pair of grooved rollers to support the first edge of the recording head in the transverse direction at the second end in the longitudinal direction; and the fourth pair of columnar rollers to support the second edge of the recording head in the transverse direction at the second end in the longitudinal direction, wherein the inclination adjuster is disposed on the second support and is configured to move the second pair of grooved rollers in the transverse direction, a movement of the second pair of grooved rollers causing the first edge of the recording head in the transverse direction at the second end in the longitudinal direction to move following the second pair of grooved rollers and causing the recording head to swing around the first end in the longitudinal direction to adjust an inclination of the recording head in the longitudinal direction, wherein the first support further includes another third pair of columnar rollers located on an opposite side of a portion where the first pair of grooved rollers is located, to support another recording head adjacent to the recording head, wherein the second support further includes another fourth pair of columnar rollers located on an opposite side of a portion where the second pair of grooved rollers is located, to support said another recording head, wherein said another fourth pair of columnar rollers is static without following the movement of the second pair of grooved rollers, wherein the first support is inclined with a side of the first support on which the first pair of grooved rollers is disposed facing obliquely upward and with a side of the first support on which the third pair of columnar rollers is disposed facing obliquely downward, wherein the second support is inclined with a side of the second support on which the second pair of grooved rollers is disposed facing obliquely upward and with a side of the second support on which the fourth pair of columnar rollers is disposed facing obliquely downward, and wherein the discharge angle adjuster includes a pushing structure to push the recording head against a force received from a weight of the recording head.

2. The recording-head position adjustment mechanism according to claim 1, wherein the discharge angle adjuster is disposed adjacent to the second pair of grooved rollers.

3. The recording-head position adjustment mechanism according to claim 1, wherein the first discharge angle adjuster on the first support and the second discharge angle adjuster on the second support adjust the discharge direction of the liquid droplets independently of each other.

4. The recording-head position adjustment mechanism according to claim 3, wherein the recording-head position adjustment mechanism is configured to removably support the recording head with the second end on a front side in an installation direction of the recording head;

wherein the first discharge angle adjuster on the first support includes a first operation structure projecting from a ceiling or a bottom of the first support; and wherein the second discharge angle adjuster on the second support includes a second operation structure projecting from a front side of the second support in the installation direction.

5. The recording-head position adjustment mechanism according to claim 1, wherein the first pair of grooved rollers is the first pair of grooved rollers configured to slidably support the two ridge rails of the recording head in the longitudinal direction while restricting the two ridge rails from moving in the transverse direction with respect to the first pair of grooved rollers, wherein the third pair of columnar rollers is the third pair of columnar rollers configured to slidably support the flat rail of the recording head in the longitudinal direction and the transverse direction, wherein the second pair of grooved rollers is configured to slidably support the two ridge rails in the longitudinal direction while restricting the two ridge rails from moving in the transverse direction with respect to the second pair of grooved rollers, and wherein the fourth pair of columnar rollers is the fourth pair of columnar rollers configured to slidably support the flat rail in the longitudinal direction and the transverse direction.

6. A recording-head module comprising:

a recording head to discharge liquid droplets; and the recording-head position adjustment mechanism according to claim 1, wherein the recording head and the recording-head position adjustment mechanism are unitized.

7. The recording-head module according to claim 6, wherein the recording head includes a plurality of recording heads, and wherein the recording-head position adjustment mechanism include a plurality of recording-head position adjustment mechanisms.

8. The recording-head module according to claim 7, wherein the plurality of recording heads and the plurality of recording-head position adjustment mechanisms are radially arranged side by side along the transverse direction.

9. An image forming apparatus comprising:

a recording head to discharge liquid droplets to a sheet;

the recording-head position adjustment mechanism according to claim 1; and a conveyor to convey the sheet to the recording head in a transverse direction intersecting a longitudinal direction of the recording head.

10. The image forming apparatus according to claim 9, wherein the recording head includes a plurality of recording heads, wherein the recording-head position adjustment mechanism include a plurality of recording-head position adjustment mechanisms, and wherein the plurality of recording heads and the plurality of recording-head position adjustment mechanisms are radially arranged side by side along the conveyor in the transverse direction.

* * * * *